(12) United States Patent
Yeager et al.

(10) Patent No.: US 7,673,143 B1
(45) Date of Patent: Mar. 2, 2010

(54) JXTA RENDEZVOUS AS CERTIFICATE OF AUTHORITY

(75) Inventors: William J. Yeager, Menlo Park, CA (US); Yu Chen, San Jose, CA (US); Brian K. Raymor, Arlington, VA (US); Jackson Wong, Menlo Park, CA (US)

(73) Assignee: Sun Microsystems, Inc., Menlo Park, CA (US)

( * ) Notice: Subject to any disclaimer, the term of this patent is extended or adjusted under 35 U.S.C. 154(b) by 1595 days.

(21) Appl. No.: 10/786,345

(22) Filed: Feb. 24, 2004

(51) Int. Cl.
*H04L 9/32* (2006.01)
(52) U.S. Cl. .................... 713/175; 713/153; 713/168
(58) Field of Classification Search ......... 713/153–157, 713/168–175
See application file for complete search history.

(56) References Cited

U.S. PATENT DOCUMENTS

| | | | |
|---|---|---|---|
| 2003/0033517 A1* | 2/2003 | Rutherglen et al. | 713/153 |
| 2003/0163702 A1* | 8/2003 | Vigue et al. | 713/176 |
| 2005/0120213 A1* | 6/2005 | Winget et al. | 713/171 |

\* cited by examiner

*Primary Examiner*—Kambiz Zand
*Assistant Examiner*—Amare Tabor
(74) *Attorney, Agent, or Firm*—Gunnison, McKay & Hodgson, L.L.P.; Philip J. McKay

(57) ABSTRACT

A method for securing a communication between a peer node and an intermediary peer node in a peer-to-peer network comprises the peer node generating a secured communication request to the intermediary peer node. The intermediary peer node authenticates the peer node in response to the secured communication request. The intermediary peer node issues a signed certificate of authority upon successful authentication.

29 Claims, 7 Drawing Sheets

JXTA RENDEZVOUS AS CERTIFICATE OF AUTHORITY

FIELD OF THE INVENTION

The present invention relates to computer networks. More particularly, the present invention relates to peer-to-peer (P2P) networks.

BACKGROUND OF THE INVENTION

Peer-to-peer networking or computing (often referred to as P2P) may be applied to a wide range of technologies that greatly increase the utilization of information, bandwidth, and computing resources in the Internet. Generally, these peer-to-peer technologies adapt to a network-based computing style that neither excludes nor inherently depends on centralized control points. Apart from improving the performance of information discovery, content delivery, and information processing, such a networked-based computing style can also enhance the overall reliability and fault-tolerance of computing systems.

FIGS. 1A and 1B are examples illustrating a peer-to-peer model. FIG. 1A shows two peer devices 10A and 104B that are connected through network 106. Either of the two peer devices 104 may serve as a client or a server to the other device. FIG. 1B shows several peer devices 104 connected over the network 106 in a peer group. In the peer group, any of the peer devices 104A, 104B, 104C, 104D, 104E, and 104F may serve as a client or a server to any of the other devices.

Peer-to-peer (P2P) networks, as illustrated in FIGS. 1A and 1B, are generally reliable because of their decentralized nature since each peer device may serve as a client or a server. However, P2P networks may suffer from performance difficulties when, for example, one peer device attempts to contact another peer device. This is because P2P networks have very few or no centralized devices directly connected to every peer device. The peer devices as illustrated in FIGS. 1A and 2B are able to discover one another through each other; each peer device plays the role of either a client, or a server, or both. Thus, the response time increases with the number of connected peer devices.

Given the ad-hoc decentralized nature of most P2P networks, the P2P network is susceptible to attacks. A need therefore exist for a mechanism to eliminate such attacks and enable enterprise strength security.

BRIEF DESCRIPTION OF THE INVENTION

A method for securing a communication between a peer node and an intermediary peer node in a peer-to-peer network comprises the peer node generating a secured communication request to the intermediary peer node. The intermediary peer node authenticates the peer node in response to the secured communication request. The intermediary peer node issues a signed certificate of authority upon successful authentication.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1A:
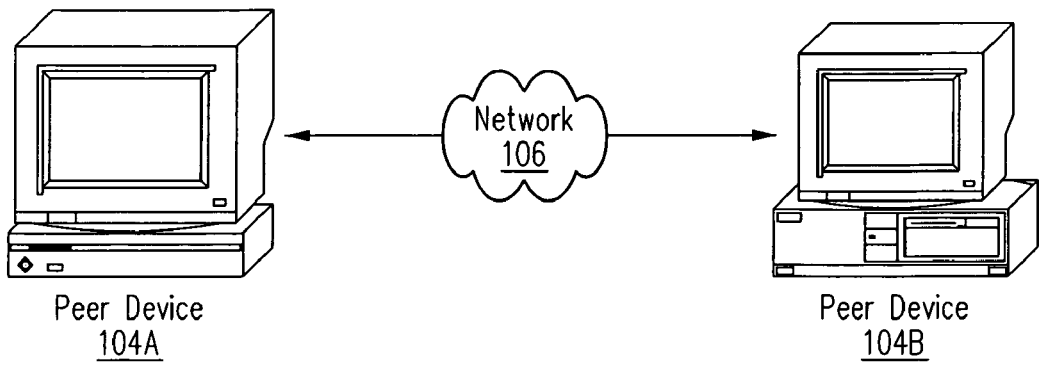
FIG. 1A is a diagram illustrating two devices connected as peers in accordance with a prior art.
Figure 1B:
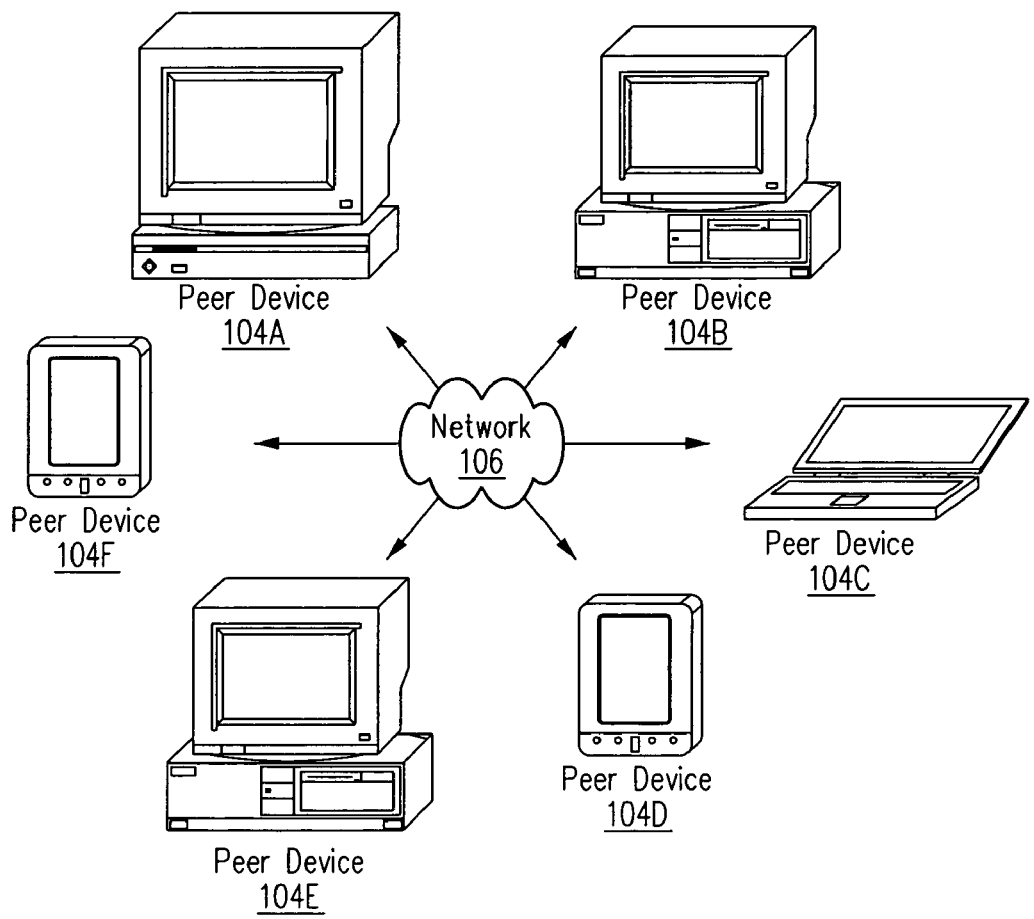
FIG. 1B is a diagram illustrating several peer devices connected over the network in a peer group in accordance with a prior art.

Embodiments of the present invention are described herein in the context of a peer-to-peer (P2P) network. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Palo Alto, Calif., Microsoft® Windows® XP and Windows® 2000, available form Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

Super peer nodes are peer nodes that serve as a intermediary contact point for administrative information that concerns the super peer nodes as well as the subset of the P2P network of which they are aware and for which they are responsible. These super peer nodes may be used to respond to Certificate Service Requests from peer nodes.

Figure 2:
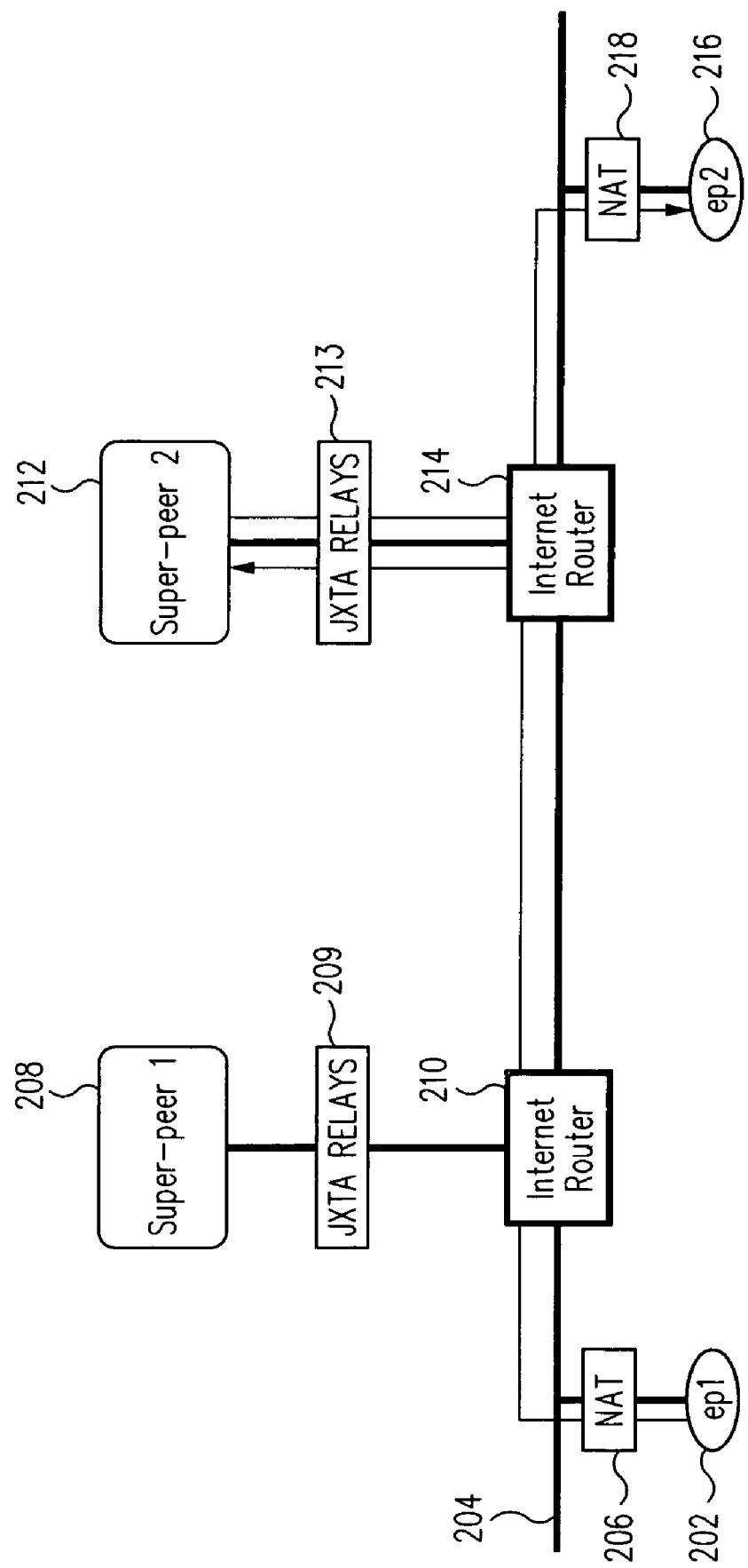
FIG. 2 is a diagram schematically illustrating intermediary peer nodes mediated P2P connections in accordance with one embodiment of the present invention.

FIG. 2 is a diagram schematically illustrating intermediary peer nodes mediated P2P connections in accordance with one embodiment of the present invention. To improve peer node discovery, responsiveness of communication, and routing super-peers have been introduced into P2P network topologies. A first peer node 202 is connected to a network connection 204, such as the internet, through a first Network Address Translator (NAT) 206. A first super peer node 208 is connected to the network connection 204 through a first JXTA relay 209 and a first router 210. A second super peer node 212 is connected to the network connection 204 through a second JXTA relay 213 and a second router 214. A second peer node 216 is connected to the network connection 204 through a second Network Address Translator (NAT) 218. It must be understood that there may be multiple routers in these network paths as well as firewalls. FIG. 2 is illustrative of one of many means to separate peer nodes and super peers on the Internet.

Super peers, also known as intermediary peer nodes, may be added with a minimal amount of centralization, and may be placed in an ad-hoc topology to be discovered by chance, or by an email message containing a known IP address and a port of a super peer. Once the presence of the super peer is known, the knowledge of their existence can be propagated amongst the peer nodes or edge-peers as they contact one another. Such super peer 208, 212, may also serve as a contact point for administrative information that concerns the super peers themselves as well as the subset of the P2P network (in FIG. 2, the subset of the P2P network includes peer node 202 and peer node 216) of which they are aware and for which they are responsible.

With respect to the implementation of securing P2P networks, the present invention is described in the context of ad-hoc JXTA P2P networks. The present description is for illustrative purposes and the method for securing P2P networks is independent of the implementation of the underlying P2P platform as long as this platform adheres to the following minimal characteristics:

1. The P2P network topology is organized around super peers such as super peer node 208 and super peer node 212 in FIG. 2.

2. The super peer nodes have knowledge of one another, and have the ability to communicate with one another on the P2P network. In FIG. 2, super peer node 208 is aware of the existence of super peer node 212 and super peer node 208 can communicate with super peer node 212 via routers 210, 214 and network connection 204.

3. Each peer node of the P2P network connects to at least one of the super-peers on a regular basis. For example, peer nodes 202 and 216 connect to super peer node 212 on a regular basis.

One of the primary axioms of P2P networks is end-to-end communication: any two peer nodes must be able to communicate, and either of them must be able to initiate a connection to the other. Because peer nodes 202, 216 are both NAT bound, neither peer nodes 202 and 216 can initiate connections to one another unless a connection is mediated through a common known third party intermediary, such as super peer node 212. In FIG. 2, peer node 202 communicates with peer node 216 via super peer node 212. Discovery or address lookup given a name is therefore handled by the super peers 208 and 212. The same initiation of communication barrier can be affected by a firewall or combinations of NAT and firewalls.

In the implementation of JXTA platform, these super-peers are also known as Rendezvous. The collection of rendezvous that have knowledge of each other's existence is called the Rendezvous site-view. Along with rendezvous whose primary responsibility is discovery, JXTA may include relays. A relay is the JXTA network router and is often found, though not required to be, in combination with a rendezvous. In FIG. 2, router 210 associated with super peer node 208 is a relay. Router 214 associated with super peer node 212 is also a relay. A JXTA edge-peer (JEP), for example peer node 202, 216, are configured to know at least one rendezvous 208 or 212/relay 210/214, if this latter is required. This information is not required when the JEPs are all on the same subnet and have IP multicast enabled.

Figure 3:
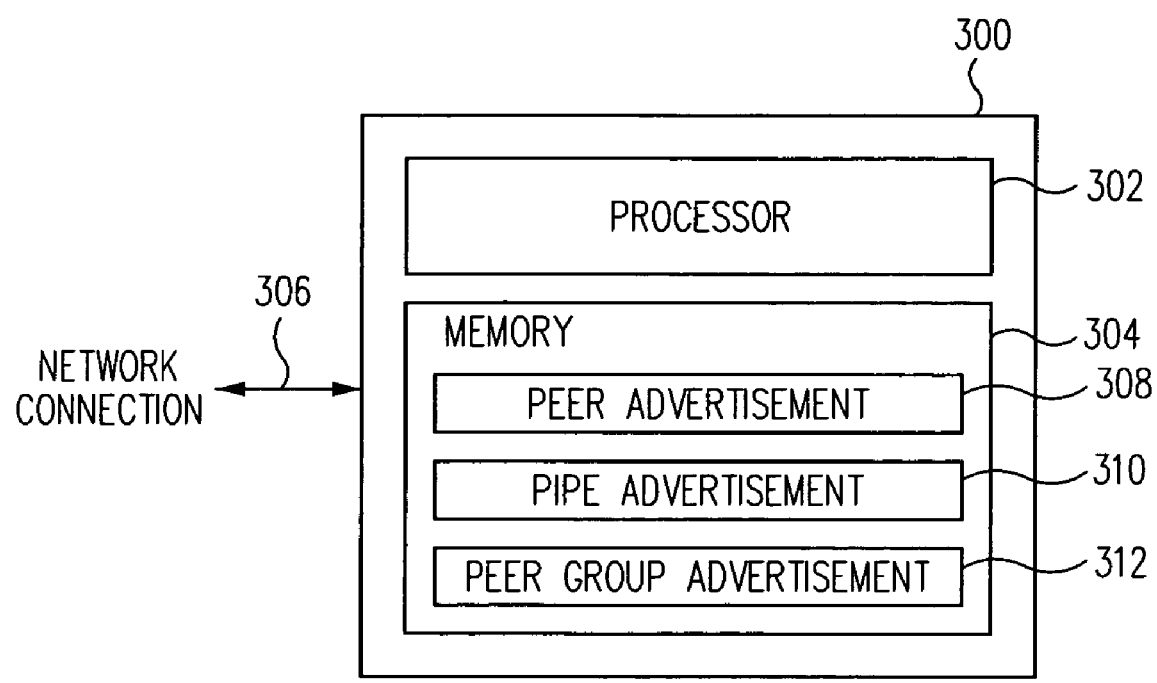
FIG. 3 is a diagram schematically illustrating a peer node in accordance with one embodiment of the present invention.

FIG. 3 illustrates a peer node in accordance with one embodiment of the present invention. In the context of JXTA platform, a JEP 300 comprises a processor 302, and a memory 304. The JEP 300 is connected to network connection 306. The memory 304 may include a set of XML documents that are self-describing and enable end-to-end, super peer mediated communication: a peer advertisement 308, a pipe advertisement 310, and a peer group advertisement 312.

The peer advertisement 308 may comprise, among other things, the JEP's name, unique peer identity, and local transport information. The pipe advertisement 310 may identify application dependent ports, and have a unique ID, name, and type. The peer group advertisements may identify subcollections of JEP's with a common purpose. Pipe advertisements 310 created within the context of a peer group can only be discovered by the JXTA discovery service associate with the peer group. Thus, peer group formation when taken along with peer group authentication and services permit independent peer groups to co-exist on the JXTA network. Peer group advertisements similarly may contain a unique ID, and a peer group name.

Figure 4:
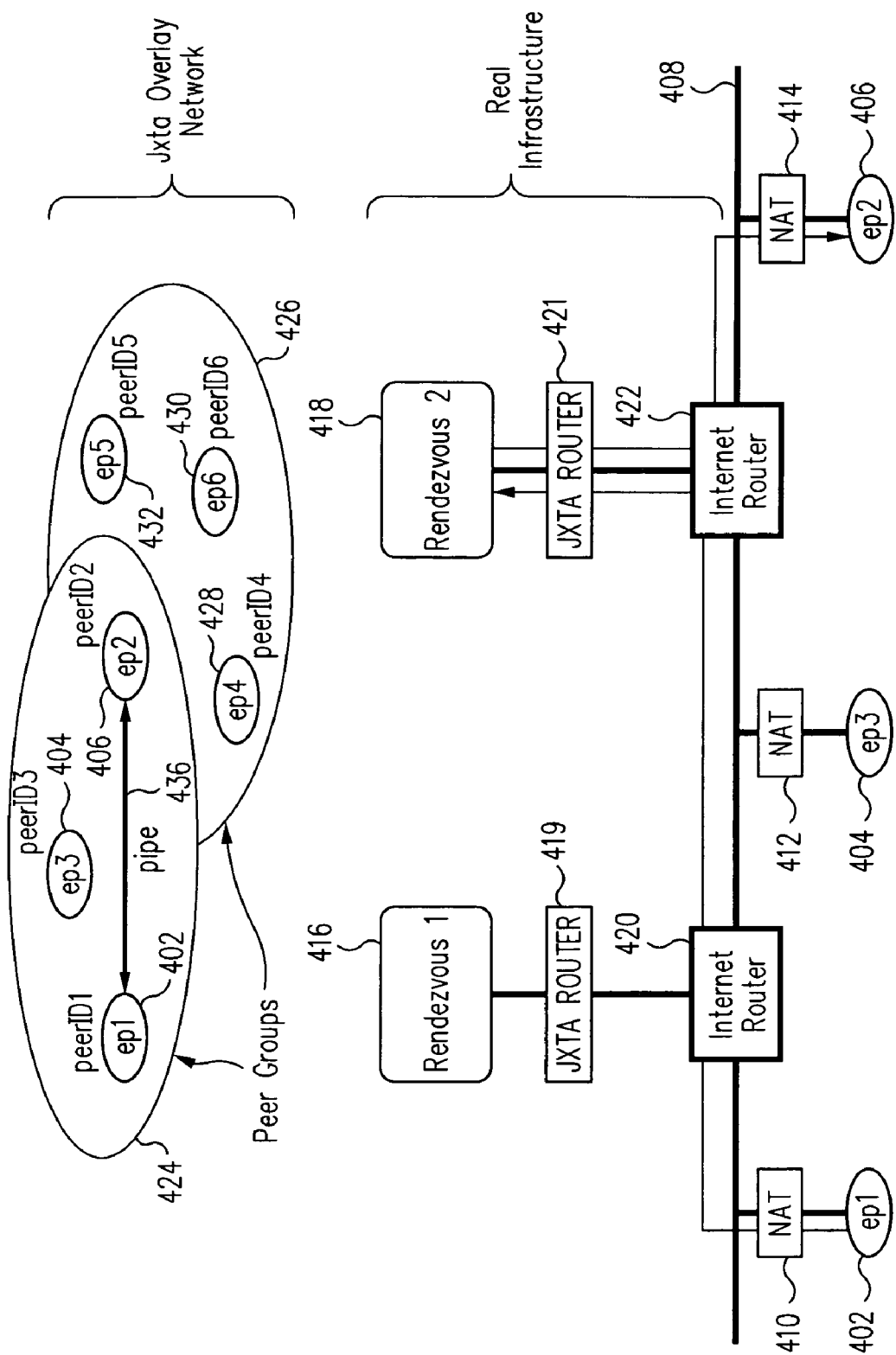
FIG. 4 is a diagram schematically illustrating the JXTA overlay network and the real infrastructure in accordance with one embodiment of the present invention.

FIG. 4 illustrates a JXTA Overlay Network and the corresponding real infrastructure in accordance with one embodiment of the present invention. In the real infrastructure, edge peer nodes 402, 404, and 406 are connected to a network connection 408 through their respective Network Address Translators (NATs) 410, 412, and 414. Rendezvous 416, 418 are connected to the network connection 408 through their respective JXTA routers 419, 421 and Internet routers 420, 422. FIG. 4 illustrates edge peer node 402 connecting with edge peer node 406 via rendezvous 418.

The set of identities of all edge peers for the JXTA Overlay Network. FIG. 4 illustrates peer groups 424 and 426. Peer group 424 comprises edge peers 402, 404, and 406. Peer group 426 comprises edge peers 428, 430, and 432. Edge peer node 402 communicates with edge peer node 406 through a pipe 436.

When a JEP boots, for example edge peer node 402, its transport addresses are updated in its peer advertisement. It then connects to its hosting rendezvous, for example rendezvous 418, receives, and adds a route advertisement to its peer advertisement if the rendezvous is aware of the relay (router 422) the JEP will use.

Next, JEP 402 applies Shared Resource Distributed Index (SRDI) to index {key "name", value} pairs of its locally cached advertisements. The latter may be either locally created or discovered. These indices are sent to its hosting rendezvous 418. The rendezvous 418 applies a DHT algorithm to the keys to replicate the {key "name", value} pairs act across the rendezvous site-view. Since JEP 402 indexes all advertisements it has cached, and the SRDI periodically looks for cache changes and also reports these to the hosting rendezvous, it is highly likely that there will be multiple JEP sources for identical advertisements.

Using the SRDI, for a pipe advertisement we would have the pair, (key Adv+"Name"+<pipe name>, peer identifier of source}. The key is replicated on a unique rendezvous using a DHT algorithm. Whenever a JEP, say JEP 402, connects to its relay, it sends a {name, value} pair such as {key "Dst-PID"+peerID of JEP, peerID of relay} to advertise this route to its hosting rendezvous using the SRDI. The rendezvous then replicates this pair with the DHT, thus permitting any route lookup for JEP 402 on the site-view to be satisfied.

Since discovery is based on name and/or unique identifiers, a JEP can be located anywhere an Internet connection is available. When a field in an advertisement changes, or a JEP reconnects to a rendezvous, it republishes its advertisements with the SRDI. Older non-locally created advertisements' indices, and distributed advertisement copies are short lived since they have short, non-local cache time outs. Thus the Overlay Network always converges to the most recent publications even given multiple sources.

Finally, when an application on JEP 402 wishes to contact its associated application pipe on JEP 406, it begins by using the Jxta discovery service to look up the source of pipe advertisement. Ultimately, a source of the advertisement receives the query and sends the advertisement to JEP 402. But the source may not have the pipe open. It may simply have it cached. Then, to resolve the pipe to the JEP that has it open, assuming that JEP 406 opened the pipe, JEP 406 also indexed this state on its rendezvous with the SRDI as {key "Dest-PID"+pipeID, peerID of JEP with open pipe}. Thus, JEP 402 using Jxta pipe resolution ultimately looks up JEP 406's peerID, then the route to JEP 406, and finally establishes pipe connection to JEP 406.

Figure 5:
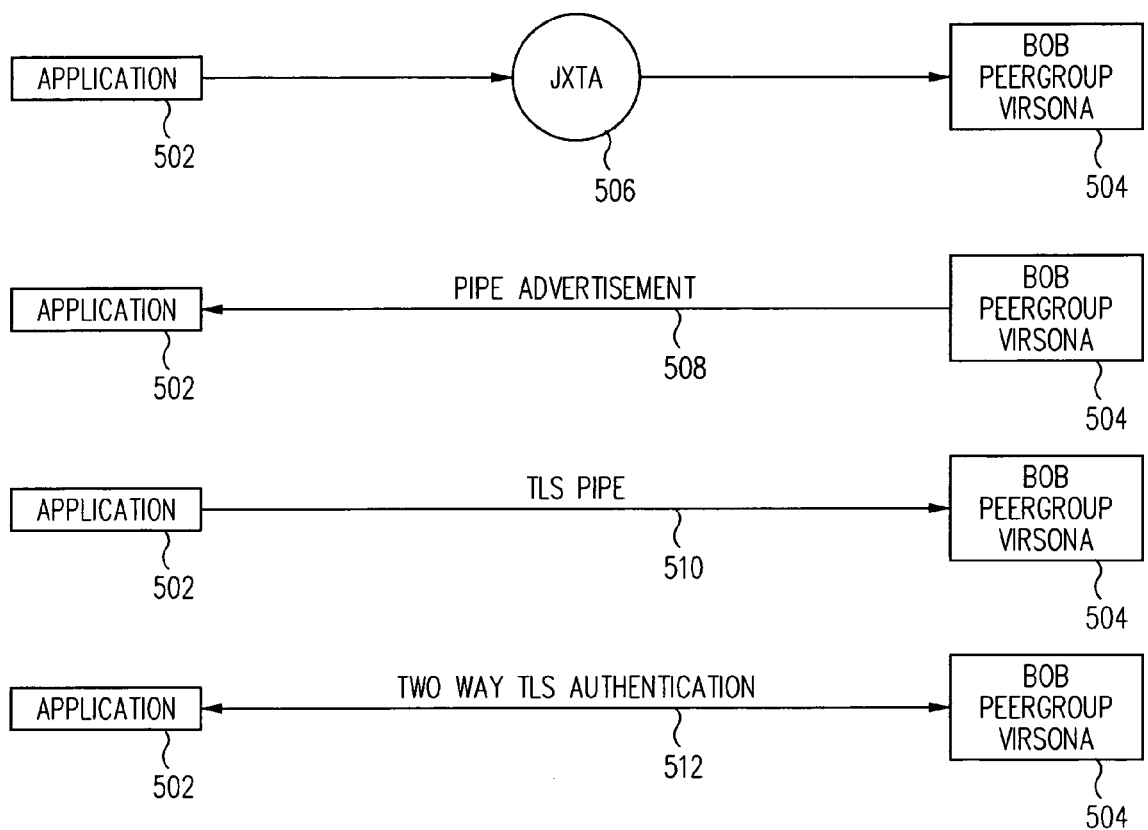
FIG. 5 is a diagram schematically illustrating an application verification of a pipe common name (CN) in accordance with one embodiment of the present invention.

FIG. 5 illustrates how a TLS connection is established between a peer node and an intermediary peer node. For illustration purposes, the intermediary peer node in the present example is also a JXTA rendezvous as previously defined. The P2P network is tied together with the different rendezvous. As explained earlier, the Rendezvous permit peer, pipe, router "discovery", firewall, and NAT traversal to be independent of the underlying network infrastructure.

The peerGroup rendezvous may have, for example, the following preconfigured addressed: rdv@west, rdv@east, and rdv@grenoble. Peer nodes utilizing the above peerGroup rendezvous have a boot time copy of each rendezvous root certificate.

As Certificate of Authorities, the Jxta rendezvous issue trusted, signed, X509.v3 client certificates. The signed certificates enable peerGroup membership, two way TLS authentication between applications within the peerGroup membership, server based TLS authentication for applications that use the peerGroup services.

The application in peer node 502 searches for a pipe to reach Bob of peerGroup Virsona 504 through Jxta platform 506. In response to the pipe search, Bob's Virsona 504 sends back a pipe advertisement 508: CBID+bits+ Virsona.Bob@sun.com. Peer node upon receiving the pipe advertisement, connects to Bob's Virsona 504 through a TLS pipe 510. Bob's Virsona 504 also verifies the Common Name (CN) to enable a two way TLS authentication 512. If the authentication fails, the pipe is closed.

The unique and secure Common Name (CN) is used as an access pass to the Virsona peerGroup and as part of the Jxta pipe identifier. The CN is acquired under LDAP by the Certificate of Authority (CA) during the CSR. A user at peer node 502 supplies an LDAP password that is sent to the Rendezvous as part of the CSR data (TLS connection). The LDAP acquired email address of the user at peer node 502 is returned as the CN of the subject's Distingued Name (DN) field of the CA issued certificate. Its uniqueness as a communication endpoint is guaranteed by the password authentication, and secured by this signed certificate and the associated peerGroup Virsona signature.

The Transport Layer Data uses TLS authentication. TLS is used by a Jxta secure pipe. After the handshake is completed, the secure pipe is connected. One can compare the CN in the authenticated certificate to the pipe identifier in use. The pipe connections close on failure of authentication.

The contact data is then stored in the peerGroup Virsona. All data is encrypted and MAC'd and placed in the Jxta indices store. This allows the peerGroup to update access privileges locally. Examples of access categories are anonymous, unauthenticated, authenticated. Thus, one can use peerGroups and Jxta's peerGroup membership services to control access.

Figure 6:
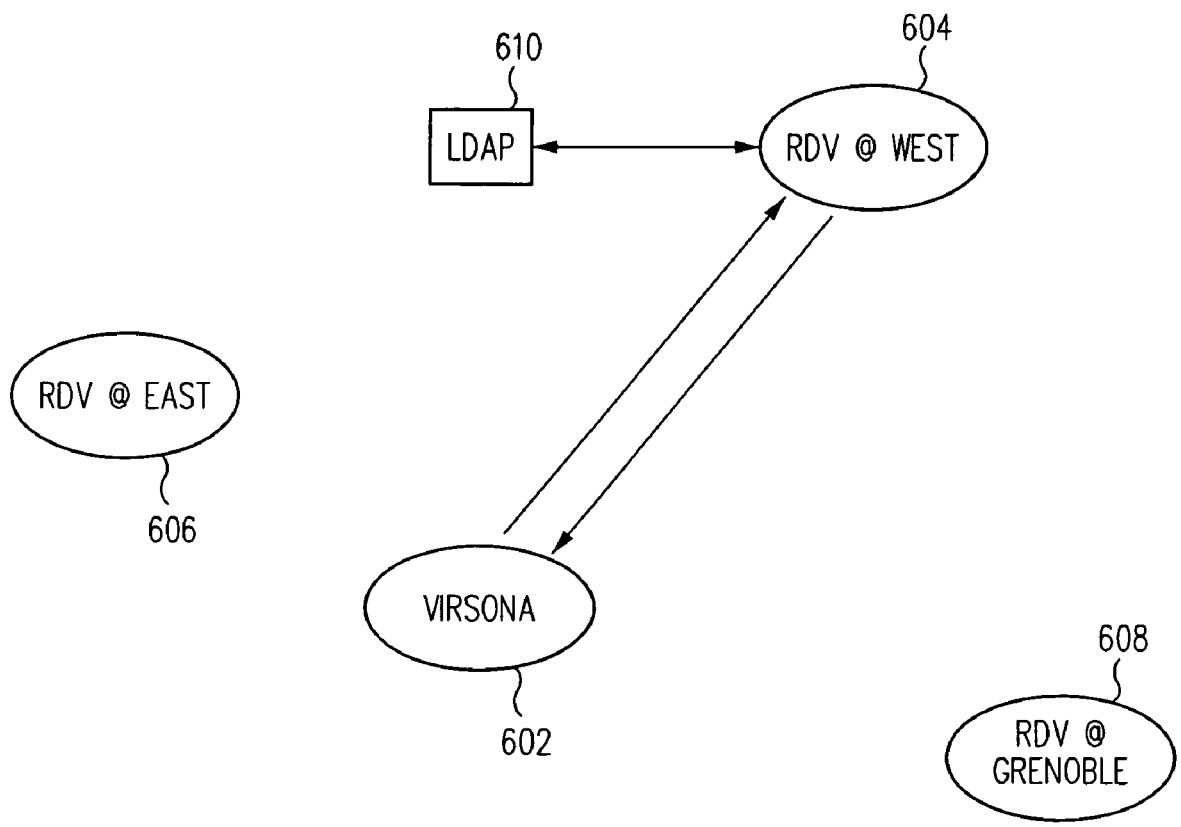
FIG. 6 is a diagram schematically illustrating a peer node acquiring a service certificate in accordance with one embodiment of the present invention.

FIG. 6 illustrates a diagram schematically illustrating a peer node acquiring a service certificate in accordance with one embodiment of the present invention. Jxta requires rendezvous for discovery when two peer nodes or edge-peers are not on the same local subnet work. In almost all cases, edge-peers maintain a persistent connection to their rendezvous. Given the latter, the following features to Jxta rendezvous are added to enable enterprise strength security:

1) Each rendezvous can respond to PKCS#10 Certificate Signing Requests from an edge-peer it supports. This exclusively uses Jxta Messages and is on the Jxta Virtual Network.

2) Each rendezvous has access to the Enterprise Data Base, and in the above example, the Corporate LDAP Directory is used.

Given the above, the edge-peer, for example peer node 602, does the following:

1) The edge-peer 602 generates a PKCS#10 Certificate Signing Request that is accompanied by the edge-peer user's identifier, for example, the employeeID, and LDAP password. In general, any unique identifier or ID and the ability to authenticate the user will do. The request is transmitted to rendezvous rdv@west 604. FIG. 6 illustrates three rendezvous in the Virsona peerGroup: rdv@west 604, rdv@east 606, rdv@grenoble 608.

2) The Rendezvous rdv@west 604 authenticates the user, and if this succeeds, then creates an X509.V3 certificate. The authentication may be accomplished by communicating with an enterprise database 610, such as an LDAP service, to retrieve the user's common name (CN).

3) The common name (CN) field in the Subject Distinguished Name of the certificate is set to the users email address, for example, William.Yeager@Sun.com. The above takes place using TLS connection.

The above mechanism results in the edge-peer being the only peer in the world that possess the X509.V3 certificate as an identity AND the RSA private key belonging to the public key in the issued certificate. Jxta does not generate unique pipe names, and this permits Jxta pipes to be spoofed. One version of Jxta uses the "CN=Email Address" field of the DN of the X509.V3 certificate as a suffix to all pipes created by the edge-peers jxta code.

This taken in conjunction with the TLS handshake on the Jxta virtual network both authenticates the edge-peer owner of the certificate, and the Jxta pipe on which the TLS session will take place. The above procedure yields a non-spoofable, Enterprise strength Jxta Virtual Network connection. While any Jxta edge-peer can advertise any pipe advertisement, and indeed open these pipes to accept input, the presently described jxta network guarantees that only one such Jxta edge-peer can do this with our pipe advertisements.

Figure 7:
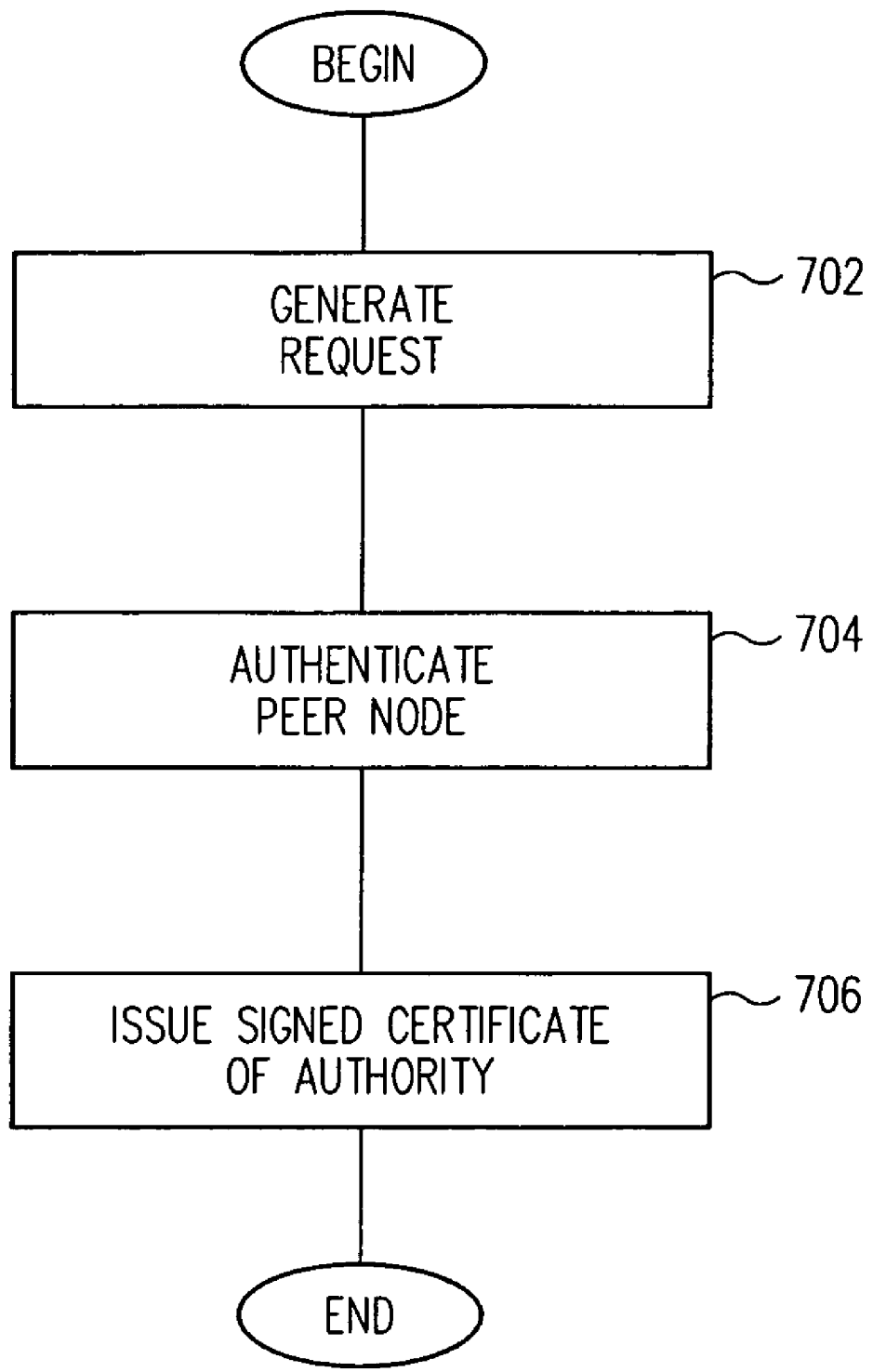
FIG. 7 is a block diagram illustrating a method for securing a communication between a peer node and an intermediary peer node in a peer-to-peer network.

FIG. 7 is flow diagram illustrating a method for securing a communication between a peer node and an intermediary peer node in a peer-to-peer network. At 702, peer node 602 generates a secured communication request to the intermediary peer node, such as a rendezvous 604. At 704, the intermediary peer node 604 authenticates the peer node 602 in response to the secured communication request. At 706, the intermediary peer node 604 issues a signed certificate of authority upon successful authentication. The authentication may be accomplished by communicating with an enterprise database 610 that authenticates the peer node 602 in response to the secured communication request.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for securing a communication between a peer node and a super peer node in a peer-to-peer network, the method comprising:
   the peer node generating a secured communication request to the super peer node, the super peer node being a peer node that serves as an intermediary contact point for administrative information that concerns the super peer node as well as a subset of the peer-to-peer network associated with the super peer node and for which the super peer node is responsible;
   the super peer node authenticating the peer node in response to said secured communication request, and
   the super peer node issuing a signed certificate of authority upon successful authentication.

2. The method of claim 1 wherein said secured communication request comprises a certificate signing request, a unique identifier, and a password.

3. The method of claim 2 wherein said certificate signing request includes a public key cryptography system (PKCS) certificate signing request.

4. The method of claim 1 wherein said secured communication protocol comprises
   a transport layer data authentication protocol.

5. The method of claim 1 wherein said super peer node is communicatively coupled to an enterprise database, said enterprise database authenticates the peer node in response to said secured communication request.

6. The method of claim 1 further comprising securing a pipe connection between the peer node and the super peer node upon authentication.

7. The method of claim 6 further comprising closing said pipe connection upon failed authentication of said node.

8. The method of claim 1 wherein said peer node comprises a peer node advertisement and a pipe node advertisement.

9. The method of claim 8 wherein said peer node advertisement comprises a peer node name, a unique peer node identifier, and local transport information.

10. The method of claim 8 wherein said pipe node advertisement includes an application-dependent port identifier, said unique identifier, a name, and a type.

11. The method of claim 1 wherein the peer-to-peer network operates using a JXTA technology-enabled platform.

12. A method for securing a communication between a peer node and a super peer node in a peer-to-peer network, the method comprising:
    generating a secured communication request to the super peer node, the super peer node being a peer node that serves as an intermediary contact point for administrative information that concerns the super peer node as well as a subset of the peer-to-peer network associated with the super peer node and for which the super peer node is responsible, the secured communication request being capable of authenticating the peer node in response to said secured communication request, and
    receiving a signed certificate of authority upon successful authentication.

13. The method of claim 12 wherein said secured communication request comprises a certificate signing request, a unique identifier, and a password.

14. The method of claim 13 wherein said certificate signing request includes a public key cryptography system (PKCS) certificate signing request.

15. The method of claim 12 wherein said secured communication protocol comprises
    a transport layer data authentication protocol.

16. The method of claim 12 wherein said super peer node is communicatively coupled to an enterprise database, said enterprise database authenticates the peer node in response to said secured communication request.

17. The method of claim 12 further comprising securing a pipe connection between the peer node and the super peer node upon authentication.

18. The method of claim 17 further comprising closing said pipe connection upon failed authentication of said node.

19. The method of claim 12 wherein said peer node comprises a peer node advertisement and a pipe node advertisement.

20. The method of claim 19 wherein said peer node advertisement comprises a peer node name, a unique peer node identifier, and local transport information.

21. The method of claim 19 wherein said pipe node advertisement includes an application-dependent port identifier, said unique identifier, a name, and a type.

22. The method of claim 12 wherein the peer-to-peer network operates using a JXTA technology-enabled platform.

23. A program storage device readable by a machine, tangibly embodying a program of instructions executable by the machine to perform a method for securing a communication between a peer node and a super peer node in a peer-to-peer network, the method including:

the peer node generating a secured communication request to the super peer node, the super peer node being a peer node that serves as an intermediary contact point for administrative information that concerns the super peer node as well as a subset of the peer-to-peer network associated with the super peer node and for which the super peer node is responsible;

the super peer node authenticating the peer node in response to said secured communication request, and the super peer node issuing a signed certificate of authority upon successful authentication.

24. A program storage device readable by a machine, tangibly embodying a program of instructions executable by the machine to perform a method for administrating peer-to-peer networks, the method including:

generating a secured communication request to a super peer node, the super peer node being a peer node that serves as an intermediary contact point for administrative information that concerns the super peer node as well as a subset of the peer-to-peer network associated with the super peer node and for which the super peer node is responsible, the secured communication request being capable of authenticating the peer node in response to said secured communication request, and receiving a signed certificate of authority upon successful authentication.

25. A program storage device readable by a machine, tangibly embodying a program of instructions executable by the machine to perform a method for administrating peer-to-peer networks, the method including:

a super peer node receiving a secured communication request from a peer node, the super peer node being a peer node that serves as an intermediary contact point for administrative information that concerns the super peer node as well as a subset of the peer-to-peer network associated with the super peer node and for which the super peer node is responsible;

authenticating the peer node in response to said secured communication request; and sending a signed certificate of authority upon successful authentication.

26. An apparatus for securing a communication between a peer node and a super peer node in a peer-to-peer network comprising:

means for generating a secured communication request to the super peer node, the super peer node being a peer node that serves as an intermediary contact point for administrative information that concerns the super peer node as well as a subset of the peer-to-peer network associated with the super peer node and for which the super peer node is responsible;

means for authenticating the peer node in response to said secured communication request, and means for issuing a signed certificate of authority upon successful authentication.

27. An apparatus for securing a communication between a peer node and a super peer node in a peer-to-peer network comprising:

means for generating a secured communication request to the super peer node, the super peer node being a peer node that serves as an intermediary contact point for administrative information that concerns the super peer node as well as a subset of the peer-to-peer network associated with the super peer node and for which the super peer node is responsible, the secured communication request being capable of authenticating the peer node in response to said secured communication request, and means for receiving a signed certificate of authority upon successful authentication.

28. A peer-to-peer network system comprising:

a peer node;

a super peer node communicatively coupled to said peer node, the super peer node being a peer node that serves as an intermediary contact point for administrative information that concerns the super peer node as well as a subset of the peer-to-peer network associated with the super peer node and for which the super peer node is responsible;

wherein said peer node is configured to generate a secured communication request to said super peer node;

wherein said super peer node is configured to authenticate said peer node in response to said secured communication request, and wherein said super peer node is configured to issue a signed certificate of authority upon successful authentication.

29. A peer node comprising:

a processor; and a memory comprising program instructions, wherein the program instructions are executable by the processor to:

generate a secured communication request to a super peer node, the super peer node being a peer node that serves as an intermediary contact point for administrative information that concerns the super peer node as well as a subset of the peer-to-peer network associated with the super peer node and for which the super peer node is responsible, the secured communication request being capable of authenticating the peer node in response to said secured communication request, and receive a signed certificate of authority upon successful authentication.

* * * * *